United States Patent
Kompella (10) Patent No.: US 9,391,873 B1
(45) Date of Patent: Jul. 12, 2016

(54) NETWORK ROUTING USING INDIRECT NEXT HOP DATA

(71) Applicant: Juniper Networks, Inc., Sunnyvale, CA (US)

(72) Inventor: Kireeti Kompella, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 14/616,484

(22) Filed: Feb. 6, 2015

Related U.S. Application Data (63) Continuation of application No. 14/021,928, filed on Sep. 9, 2013, now Pat. No. 8,953,626, which is a continuation of application No. 12/847,735, filed on Jul. 30, 2010, now Pat. No. 8,532,127, which is a continuation of application No. 10/045,717, filed on Oct. 19, 2001, now abandoned.

(51) Int. Cl.

| | |
|---|---|
| *H04L 12/54* | (2013.01) |
| *H04L 12/733* | (2013.01) |
| *H04L 12/751* | (2013.01) |
| *H04L 12/773* | (2013.01) |
| *H04L 12/44* | (2006.01) |

(52) U.S. Cl.
CPC ............... *H04L 45/20* (2013.01); *H04L 12/44* (2013.01); *H04L 12/56* (2013.01); *H04L 45/02* (2013.01); *H04L 45/60* (2013.01)

(58) Field of Classification Search
CPC ......... H04L 45/02; H04L 45/20; H04L 45/28; H04L 45/60; H04L 12/44; H04L 12/56
See application file for complete search history.

(56) References Cited

U.S. PATENT DOCUMENTS

| | | |
|---|---|---|
| 5,295,154 A | 3/1994 | Meier et al. |
| 5,909,440 A | 6/1999 | Ferguson et al. |
| 5,926,101 A | 7/1999 | Dasgupta |
| 6,047,331 A | 4/2000 | Medard et al. |
| 6,067,574 A | 5/2000 | Tzeng |
| 6,192,051 B1 | 2/2001 | Lipman et al. |
| 6,266,706 B1 | 7/2001 | Brodnik et al. |
| 6,359,858 B1 | 3/2002 | Smith et al. |
| 6,463,061 B1 | 10/2002 | Rekhter et al. |
| 6,498,795 B1 | 12/2002 | Zhang et al. |
| 6,549,519 B1 | 4/2003 | Michels et al. |

(Continued)

OTHER PUBLICATIONS

U.S. Appl. No. 10/045,717, filed Oct. 19, 2001, by Kompella, Kireeti.

(Continued)

*Primary Examiner* — Kevin Mew
(74) *Attorney, Agent, or Firm* — Shumaker & Sieffert, P.A.

(57) ABSTRACT

A router maintains routing information including (i) route data representing destinations within a computer network, (ii) next hop data representing interfaces to neighboring network devices, and (iii) indirect next hop data that maps a subset of the routes represented by the route data to a common one of the next hop data elements. In this manner, routing information is structured such that routes having the same next hop use indirect next hop data structures to reference common next hop data. In particular, in response to a change in network topology, the router need not change all of the affected routes, but only the common next hop data referenced by the intermediate data structures. This provides for increased efficiency in updating routing information after a change in network topology, such as link failure.

12 Claims, 6 Drawing Sheets

(56) References Cited

U.S. PATENT DOCUMENTS

| | | | |
|---|---|---|---|
| 6,553,002 | B1 | 4/2003 | Bremer et al. |
| 6,618,760 | B1 | 9/2003 | Aramaki et al. |
| 6,643,706 | B1 | 11/2003 | Marques et al. |
| 6,665,297 | B1 | 12/2003 | Hariguchi et al. |
| 6,693,878 | B1 | 2/2004 | Daruwalla et al. |
| 6,717,950 | B2 | 4/2004 | Lui et al. |
| 6,744,774 | B2 | 6/2004 | Sharma |
| 6,857,026 | B1 | 2/2005 | Cain |
| 6,859,455 | B1 | 2/2005 | Yazdani et al. |
| 6,888,838 | B1 | 5/2005 | Ji et al. |
| 6,906,998 | B1 | 6/2005 | Mujeeb et al. |
| 6,999,468 | B2 | 2/2006 | Lund et al. |
| 7,016,379 | B2 | 3/2006 | Falkenstein et al. |
| 7,058,725 | B2 | 6/2006 | Mathew et al. |
| 7,061,911 | B2 | 6/2006 | Furuno |
| 7,088,717 | B2 | 8/2006 | Reeves et al. |
| 7,184,437 | B1 | 2/2007 | Cole et al. |
| 7,325,071 | B2 | 1/2008 | Krishnan |
| 7,349,415 | B2 | 3/2008 | Rangarajan et al. |
| 7,362,709 | B1 | 4/2008 | Hui et al. |
| 7,447,149 | B1 | 11/2008 | Beesley et al. |
| 7,512,080 | B1 | 3/2009 | Kompella et al. |
| 7,564,841 | B2 | 7/2009 | Wybenga et al. |
| 7,580,394 | B2 | 8/2009 | Garcia-Luna-Aceves |
| 7,746,790 | B1 | 6/2010 | Cole et al. |
| 7,814,185 | B2 | 10/2010 | Choe |
| 7,903,658 | B1 | 3/2011 | Kireeti et al. |
| 7,978,718 | B2 | 7/2011 | Farinacci et al. |
| 8,014,293 | B1 | 9/2011 | Cole et al. |
| 8,018,944 | B1 | 9/2011 | Kopelman et al. |
| 8,189,576 | B2 | 5/2012 | Ferguson et al. |
| 8,532,127 | B2 | 9/2013 | Kompella |
| 8,953,626 | B2 | 2/2015 | Kompella |
| 2001/0028651 | A1 | 10/2001 | Murase |
| 2001/0033548 | A1* | 10/2001 | Saleh ............... H04J 14/0295 370/218 |
| 2002/0112072 | A1 | 8/2002 | Jain |
| 2002/0143747 | A1 | 10/2002 | Tal et al. |
| 2003/0026246 | A1* | 2/2003 | Huang ............... H04L 45/00 370/352 |
| 2003/0031167 | A1 | 2/2003 | Singh et al. |
| 2003/0091043 | A1 | 5/2003 | Mehrotra et al. |
| 2003/0117966 | A1 | 6/2003 | Chen |
| 2003/0179742 | A1 | 9/2003 | Ogier et al. |
| 2003/0198234 | A1 | 10/2003 | Pin |
| 2003/0202520 | A1 | 10/2003 | Witkowski et al. |
| 2003/0235152 | A1 | 12/2003 | Shibasaki |
| 2004/0078625 | A1 | 4/2004 | Rampuria et al. |
| 2004/0205229 | A1 | 10/2004 | Stojancic |
| 2005/0195831 | A1 | 9/2005 | Wybenga et al. |
| 2005/0276215 | A1 | 12/2005 | Kitani et al. |
| 2011/0149849 | A1 | 6/2011 | Brownrig |
| 2011/0199891 | A1* | 8/2011 | Chen ............... H04L 45/22 370/218 |
| 2012/0275459 | A1 | 11/2012 | Ferguson et al. |

OTHER PUBLICATIONS

Prosecution History from U.S. Appl. No. 10/045,717, dated Aug. 24, 2005 through Sep. 25, 2007, 125 pp.

Prosecution History from U.S. Appl. No. 12/847,735, dated Jul. 20, 2012 through May 13, 2013, 43 pp.

Prosecution History from U.S. Appl. No. 14/021,928, dated Sep. 10, 2014 through Dec. 18, 2014, 34 pp.

Prosecution History from U.S. Appl. No. 10/197,922, dated Aug. 23, 2006 through Dec. 11, 2006, 30 pp.

Prosecution History from U.S. Appl. No. 11/670,272, dated Sep. 14, 2009 through Feb. 24, 2010, 26 pp.

Prosecution History from U.S. Appl. No. 12/820,962, dated Sep. 30, 2010 through Mar. 9, 2011, 17 pp.

Prosecution History from U.S. Appl. No. 10/952,457, dated Dec. 14, 2007 through Jul. 28, 2008, 24 pp.

* cited by examiner

| | | | |
|---|---|---|---|
| 0 | NH10 | IFC10 | PROCESSING MODULE(S) |
| 1 | NH2 | IFC2 | PROCESSING MODULE(S) |
| 2 | NH7 | IFC7 | PROCESSING MODULE(S) |
| 3 | NH3 | IFC3 | PROCESSING MODULE(S) |
| 4 | NH12 | IFC12 | PROCESSING MODULE(S) |
| 5 | NH9 | IFC9 | PROCESSING MODULE(S) |
| ⋮ | ⋮ | ⋮ | ⋮ |
| N-6 | NH1 | IFC1 | PROCESSING MODULE(S) |
| N-5 | NH8 | IFC8 | PROCESSING MODULE(S) |
| N-4 | NH13 | IFC13 | PROCESSING MODULE(S) |
| N-3 | NH5 | IFC5 | PROCESSING MODULE(S) |
| N-2 | NH6 | IFC6 | PROCESSING MODULE(S) |
| N-1 | NH4 | IFC4 | PROCESSING MODULE(S) |

NETWORK ROUTING USING INDIRECT NEXT HOP DATA

This application is a continuation of U.S. application Ser. No. 14/021,928, filed Sep. 9, 2013, which is a continuation of U.S. application Ser. No. 12/847,735, filed Jul. 30, 2010, now U.S. Pat. No. 8,532,127, issued Sep. 10, 2013, which is a continuation of U.S. application Ser. No. 10/045,717, filed Oct. 19, 2001, the entire contents of each of which are incorporated herein by reference.

TECHNICAL FIELD

The invention relates to computer networks and, more particularly, to techniques for routing packets within computer networks.

BACKGROUND

A computer network is a collection of interconnected computing devices that can exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices, referred to as routers, maintain routing information that describes routes through the network. A "route" can generally be defined as a path between two locations on the network. Upon receiving an incoming packet, the router examines information within the packet to identify the destination for the packet. Based on the destination, the router forwards the packet in accordance with the routing information.

Conventional routers often maintain the routing information in the form of one or more routing tables. The form and contents of the routing tables often depends on the routing algorithm implemented by the router. Common routing algorithms include distance vector routing algorithms and path vector routing algorithms. Many of these algorithms make use of the concept of a "hop," which refers to a connection between two devices. Consequently, the distance between two devices is often measured in hops. Furthermore, in reference to routing a packet, the "next hop" from a network router typically refers to a neighboring device along a given route.

The physical connection between two devices on a network is generally referred to as a link. Many conventional computer networks, including the Internet, are designed to dynamically reroute data packets in the event of a topology change, such as a link failure. Upon a topology change, the routers transmit new connectivity information to neighboring devices, allowing each device to update its local routing information. Links can fail for any number of reasons, such as failure of the physical infrastructure between the devices, or failure of the devices interfacing with the link. The size and complexity of routing information maintained by routers within large networks can be significant. As a result, updating the routing information due to changes in network topology can consume considerable computing resources and substantially delay rerouting of packets.

SUMMARY

In general, the invention provides for increased efficiency in updating routing information after a change in network topology, such as link failure. According to the principles of the invention, a router maintains routing information that makes use of indirect references to identify the appropriate next hop for each route. In other words, intermediate data structures are introduced, referred to herein as indirect next hop data, between the routing information and the next hop information. The routing information is structured such that routes having the same next hop use indirect next hop data structures to point to common next hop data.

The invention offers many advantages, including reducing the impact and latency of network topology changes by reducing the computer resources required to update the routing information. In particular, in response to a change in network topology, the router need not change all of the affected routes, only the common next hop data referenced by the intermediate data structures. The router can, for example, overwrite the common next hop data with new next hop data. In this fashion, the router can effectively update a large number of routes, and thereby dynamically reroute packets, with minimal changes to the routing information.

In one embodiment, the invention is directed to a method including routing packets within a network using indirect next hop data that associates a plurality of routes with a common portion of next hop data.

In another embodiment, the invention is directed to a method including storing route data representing routes within a computer network, and storing next hop data representing network devices that neighbor a network router. The method further includes storing indirect next hop data that maps at least a subset of the routes represented by the route data to a common portion of the next hop data. The route data may be stored as a radix tree, and the indirect next hop data may be stored as data pointers within leaf nodes of the radix tree.

In another embodiment, the invention is directed to a router comprising a routing engine to store routing information representing a topology of a network. The router further comprises a packet forwarding engine to store packet forwarding information in accordance with the routing information, the packet forwarding information including (i) route data representing destinations within a computer network, (ii) next hop data representing interfaces to neighboring network devices, and (iii) indirect next hop data that maps a subset of the routes represented by the route data to a common portion of the next hop data.

In another embodiment, the invention is directed to a router comprising a computer-readable medium to store: (i) route data representing routes within a computer network, (ii) next hop data representing neighboring network devices, and (iii) indirect next hop data that maps at least a subset of route data to a common portion of the next hop data.

In another embodiment, the invention is directed to a computer-readable medium containing data structures. The data structures include a first data structure to store route data representing destinations within a computer network, a second data structure to store next hop data representing interfaces to neighboring network devices, and a set of indirect next hop data that map at least a subset of the route data to a common portion of the next hop data.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
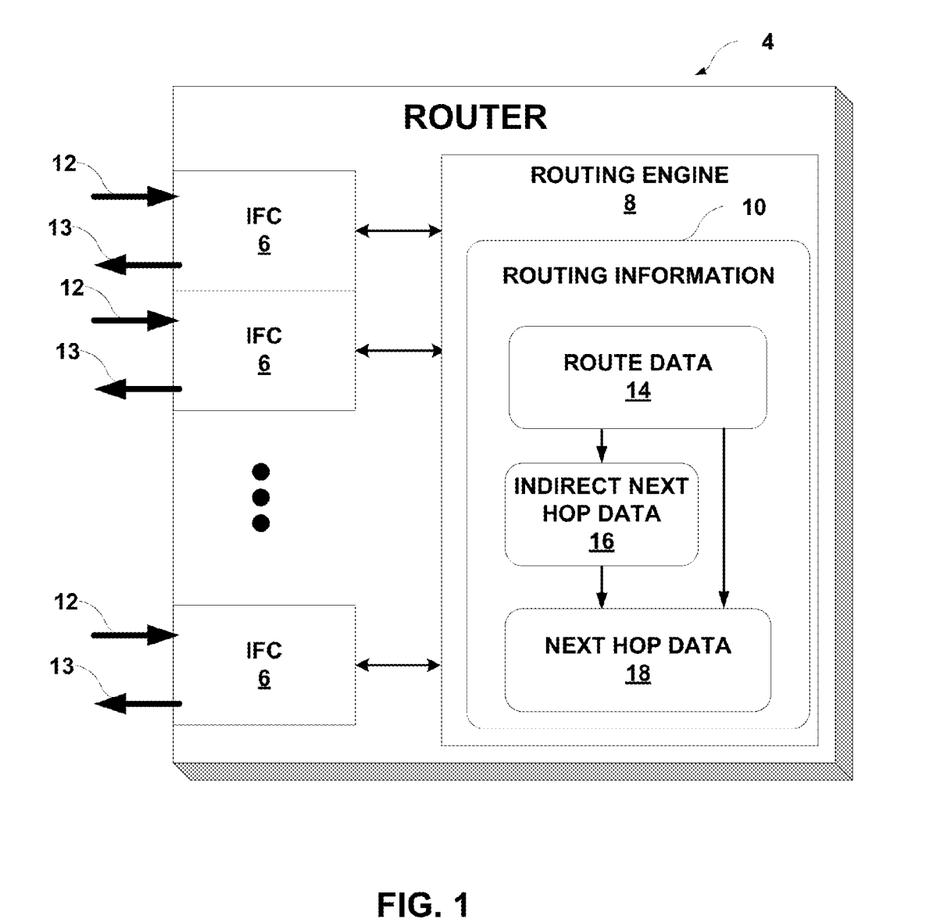
FIG. 1 is a block diagram illustrating an example router configured consistent with the principles of the invention.

FIG. 1 is a block diagram illustrating an example router 4 configured consistent with the principles of the invention. In the exemplary embodiment illustrated in FIG. 1, router 4 includes one or more interface cards (IFCs) 6 for sending and receiving packets using network links 12 and 13. IFCs 6 are typically coupled to network links 12, 13 via a number of interface ports. In general, router 4 receives inbound packets from network links 12, determines destinations for the received packets, and outputs the packets on network links 13 based on the destinations.

Router 4 includes a routing engine 8 that maintains routing information 10, which describes a topology of a network and, in particular, the routes through the network. Routing information 10 may include, for example, route data 14 that describes various routes within the network, and corresponding next hop data 18 indicating appropriate neighboring devices within the network for each of the routes.

Routing information 10 may associate each next hop with one of network links 13 or IFCs 6. In particular, upon receiving an inbound packet, routing engine 8 determines a route within route data 14 for the inbound packet, and examines next hop data 18 of routing information 10 to identify a next hop for the packet. Based on the identified next hop, routing engine 8 determines an interface port associated with the next hop, and forwards the inbound packet to the appropriate IFC 6 for transmission. The architecture of router 4 illustrated in FIG. 1 is for exemplary purposes only. The invention is not limited to this architecture. In other embodiments, router 4 may be configured in a variety of ways. In one embodiment, for example, routing engine 8 and its corresponding functionality may be replicated and incorporated directly within IFCs 6.

According to the principles of the invention, routing information 10 may make use of indirect references to associate routes with corresponding next hops. In other words, routing information 10 may use intermediate data structures, referred to herein as indirect next hop data 16, that maps route data 14 to next hop data 18. In particular, indirect next hop data 16 is structured such that routes that make use of the same next hop from router 4 reference a common portion of next hop data 18. In this manner, router 4 need not maintain separate next hop data for each individual route. In addition, routing information 10 may maintain references that bypass indirect next hop data 16, and associate route data 14 directly with next hop data 18.

In response to a change in network topology, routing engine 8 can dynamically reroute packets for multiple routes by changing a common portion of next hop data 18. More specifically, because routes using the same next hops share a common portion of next hop data 18, routing engine 8 can update next hop data 18 without needing to update route data 14, which can be significantly large for some networks. In this fashion, routing engine 8 can update large number of routes, and thereby quickly reroute packets, with minimal changes to the routing information 10.

Figure 2A:
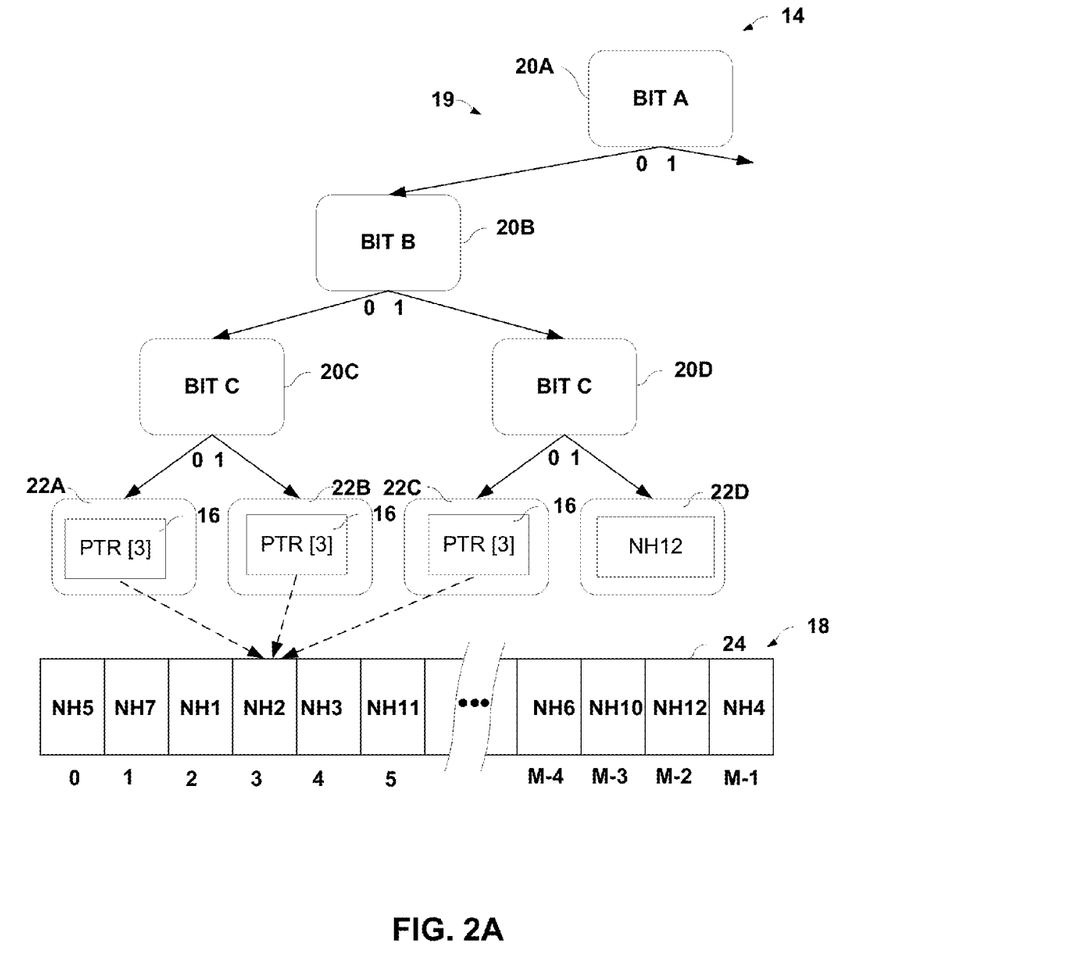
FIG. 2A is a block diagram illustrating data structures for one exemplary arrangement of routing information making use of indirect next hop data.

FIG. 2A is a block diagram illustrating example data structures for one arrangement of routing information 10. In the illustrated embodiment, route data 14 of routing information 10 is arranged as a radix tree 19 that maps network routes to indirect next hop data 16 and next hop data 18. More specifically, radix tree 19 includes a number of leaf nodes 22A, 22B, 22C, 22D, collectively referred to as leaf nodes 22. Each of leaf nodes 22 corresponds to a network route. For large networks, radix tree 19 can become sizable and may easily include over 300,000 leaf nodes 22. Consequently, for exemplary purposes, FIG. 2 depicts a portion of radix tree 19. The arrangement of routing information 10 as a radix tree is illustrated for exemplary purposes. The principles of invention may readily be applied to other arrangements. Routing information 10 may be arranged, for example, as a number of tables, link lists, and other data structures that store pointers to indirect next hop data 16 and next hop data 18.

Upon receiving an inbound packet, routing engine 8 reads a block of data corresponding to the packet, referred to as the "key," that includes a network destination. The key may, for example, contain a routing prefix for another router within the network. Routing engine 8 resolves the key to one of leaf nodes 22 by traversing radix tree 19. In particular, routing engine 8 traverses radix tree 19 by sequentially testing bits A, B and C, which represent any bits within the key. Based on the value of each bit A, B, C, routing engine 8 follows the links of radix tree 19 through the various levels until reaching one of leaf nodes 22.

Leaf nodes 22A, 22B and 22C include indirect next hop data 16 that references an array 24 storing next hop data 18. In particular, the indirect next hop data 16 points to one of the elements of array 24, thereby identifying a corresponding next hop for a respective network destination. In this manner, leaf nodes 22A, 22B and 22C of radix tree 19 do not contain next hop information, but include references to next hop data 18 that is stored in a separate data structure. In this fashion, indirect next hop data 16 provides intermediate data structures that relate route data 14 to next hop data 18. Leaf node 22D stores, however, stores next hop data NH12, and thereby bypasses indirect next hop data 16. In an alternative embodiment, array 24 may store references to specific interface ports, processing modules, or both.

Upon resolving a key of an inbound packet to one of leaf nodes 22A, 22B and 22C, routing engine 8 uses the contained one of indirect next hop data 16 to read next hop data from the referenced element of array 24. In the illustrated example, routing engine 8 resolves a packet key of "010" to leaf node 22C. Routing engine 8 uses the pointer contained within indirect hop data structure 22C to access the fourth element of array 24, i.e., the element with an index equal to 3, thereby resolving the key to next hop data NH2. Upon resolving the destination to a next hop, routing engine 8 determines an interface port associated with the actual next hop NH2, and forwards the inbound packet to the appropriate IFC 6 for transmission.

As illustrated in FIG. 2A, network routes corresponding to leaf nodes 22A, 22B, 22C share a common next hop. In other words, router 4 forwards all packets destined for these routes to the same neighboring network node, i.e., the same next hop. Consequently, according to the principles of the invention, the indirect next hop data 16 within leaf nodes 22A, 22B, 22C reference a common portion of next hop data, i.e., element 3 of array 24. If a network event occurs that requires rerouting packets along these routes, such as failure of the link between router 4 and the neighboring device, routing engine 8 can dynamically reroute the packets by modifying array 24. In particular, routing engine 8 can overwrite the next hop data NH2 of element 3 with new next hop data. In response to a network event, routing engine 8 may, for example, write NH12 to element 3 of array 24, thereby quickly rerouting packets destined for NH2 to an alternate next hop, i.e., NH12.

In this manner, separating route data 14 from next hop data 18 by indirect next hop data 16 provides many advantages. Routing engine 8, for example, need not update radix tree 19 and, in particular, each of leaf nodes 22A, 22B and 22C. In large networks, it is not uncommon for 50,000 or more network destinations to have the same next hop from a routing device. By making use of intermediate references between radix tree 19 and the next hop data stored within array 18, instead of incorporating the next hop data within the radix tree 19, routing engine 8 need not change all of the affected leaf nodes 22, only the common next hop data. In this fashion, router 4 can dynamically reroute packets with minimal changes to the routing information 10.

Figure 2B:
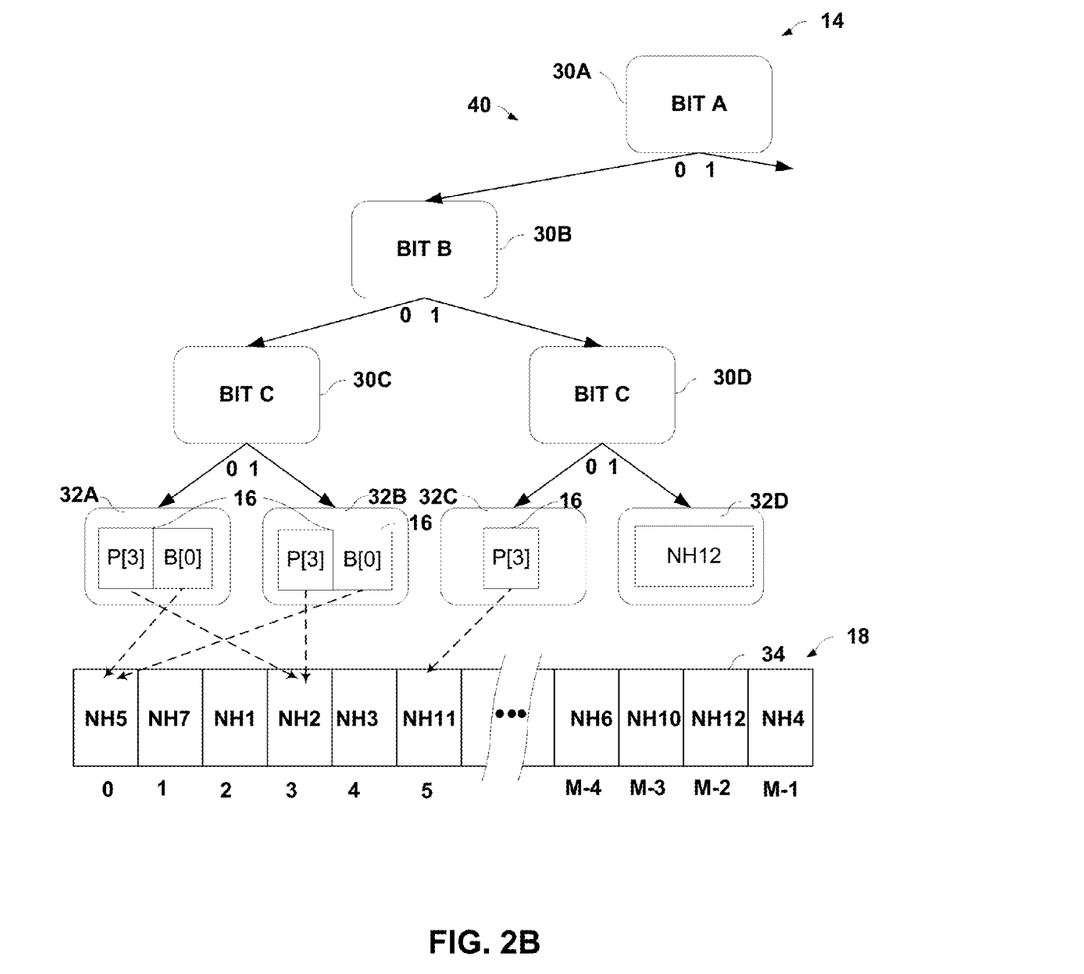
FIG. 2B is a block diagram illustrating data structures for another exemplary arrangement of routing information making use of indirect next hop data.

FIG. 2B is a block diagram illustrating a second exemplary arrangement of routing information 10. In the illustrated embodiment, route data 14 of routing information 10 is arranged as a radix tree 40 that maps network routes to indirect next hop data 16 and next hop data 18. Radix tree 40 includes a number of leaf nodes 32A, 32B, 32C, 32D, collectively referred to as leaf nodes 32.

As illustrated in FIG. 2B, indirect next hop data 16 of leaf nodes 32 may include multiple references to array 34 storing next hop data 18. Leaf nodes 32A and 32B, for example, include primary (P) references and backup (B) references to portions of next hop data 18. For exemplary purposes, the primary references of leaf nodes 32A and 32B reference a common portion of next hop data, i.e., element 3 of array 24. The backup references of leaf nodes 32A and 32B reference a common backup next hop, as identified within element 0 of array 24. In this manner, indirect next hop data 16 for nodes 32A, 32B indicates that next hop NH5 is to be used in the event next hop NH2 fails. Leaf node 32C includes a single primary reference that identifies a portion of next hop data 18.

To generate radix tree 40, routing engine 8 precomputes alternative next hop and adds the alternative next hops to array 34. Based on the alternative next hops, routing engine 8 may include primary and backup references within leaf nodes 32 of radix tree 40, and may mark these references as active or inactive based on the current network topology.

This arrangement may provide a number of advantages when a network event, such as failure of a network link, requires router 4 to reroute packets. In particular, routing engine 8 can quickly reroute the packets from a primary next hop to a backup next hop without regenerating radix tree 40. For routes making use of a failed next hop, routing engine 8 may promote any backup references within corresponding leaf nodes 32 to primary references, and may mark the existing primary references as inactive. In this manner, routing engine 8 can quickly reroute packets to a precomputed backup next hop with minimal changes to routing information 10.

When an inactive next hop becomes available, routing engine 8 identifies those leaf nodes 32 referencing the next hop and marks the references as active. Routing engine 8 may promote the newly activated next hop to a primary next hop, or may designate the next hop as a backup next hop.

Figure 3:
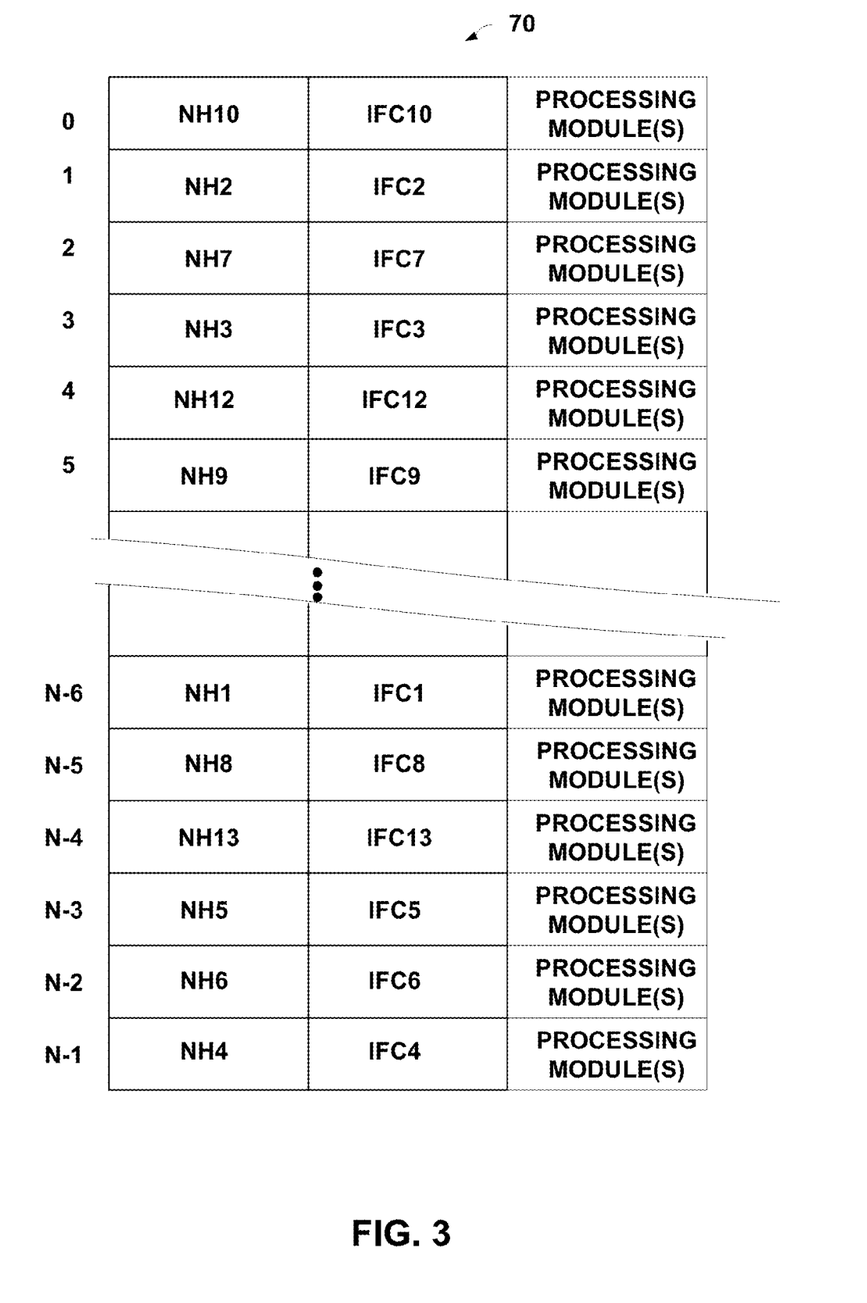
FIG. 3 is a block diagram illustrating an example data structure for resolving next hop data to interface ports or other next hop actions.

FIG. 3 is a block diagram illustrating an example data structure 70 for resolving next hop data 18 to interface ports.

In the illustrated embodiment, data structure 70 forms a two-dimensional array having N rows and 3 columns. Each row uniquely associates a next hop with an interface port. Row 0, for example, associates next hop data NH10 with interface port IFC10. Although as illustrated each row maps a next hop to an interface port, data structure 70 could be used to map a next hop to any type of processing module. A row may, for example, map a packet to one of a number of network protocol modules, such as TCP/IP or MPLS, executing on the router for processing. In addition, a row may list zero or more other processing modules including, for example, a packet filtering module, a packet counting module, a policy enforcement module, and a rate-limiting module.

Figure 4:
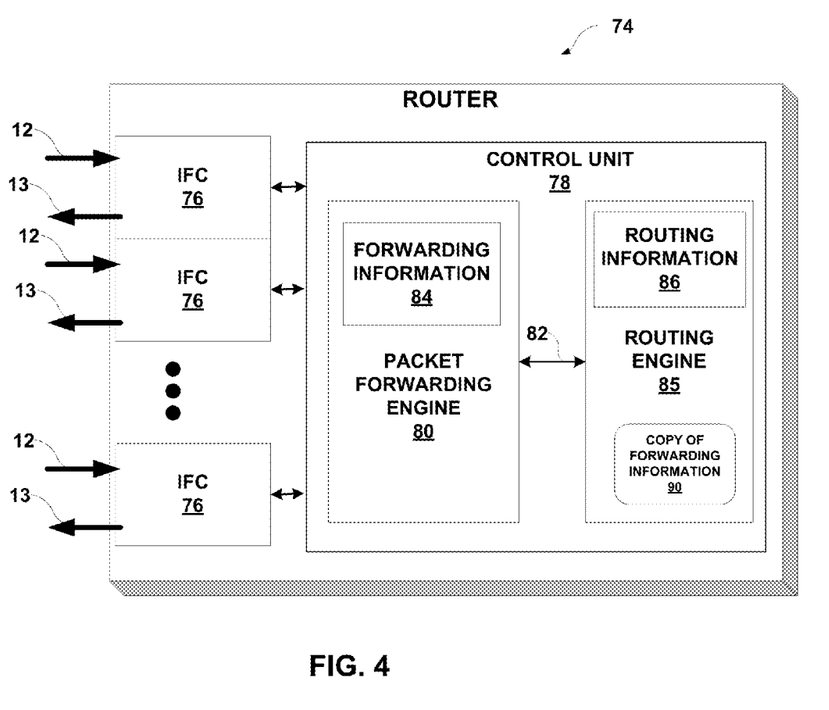
FIG. 4 is a block diagram illustrating another example router configured consistent with the principles of the invention.

FIG. 4 is a block diagram illustrating another example router 74 configured consistent with the principles of the invention. Router 74 includes control unit 78 that directs inbound packets received from inbound link 12 to the appropriate outbound link 13. In particular, the functionality of control unit 78 is divided between a routing engine 85 and a packet forwarding engine 80.

Routing engine 85 is primarily responsible for maintaining routing information 86 to reflect the current network topology. In particular, routing engine 85 periodically updates routing information 86 to accurately reflect the network topology.

In accordance with routing information 86, packet forwarding engine 80 maintains forwarding information 84 that associates network destinations with specific next hops and corresponding interface ports of IFCs 6. Forwarding information 84 may, therefore, be thought of as a subset of the information contained within routing information 86. Upon receiving an inbound packet, packet forwarding engine 80 directs the inbound packet to an appropriate IFCs 6 for transmission based on forwarding information 84. In one embodiment, each of packet forwarding engine 80 and routing engine 85 may comprise one or more dedicated processors, hardware, and the like, and may be communicatively coupled by data communication channel 82. Data communication channel 82 may be a high-speed network connection, bus, shared-memory or other data communication mechanism.

When a network event occurs, such as a link failure, routing engine 85 updates routing information 86 and directs packet forwarding engine 80 to update forwarding information 84. Routing engine 85 may, for example, communicate one or more messages over data communication channel 82 directing packet forwarding engine 80 to update the next hop data for one or more network destinations.

Forwarding engine 80, routing engine 85, or both, may make use of the data structures and organization described above. In particular, packet forwarding engine 80 may maintain forwarding information 84 so as to make use of indirect next hop data. The indirect next hop data may associate, for example, leaf nodes of a forwarding tree with next hop data. This embodiment may be advantageous in that, in response to an update message from routing engine 85, packet forwarding engine 80 may need only update next hop data that is referenced by the indirect next hop data structures, and not the forwarding tree itself.

In addition, routine engine 85 may organize routing information 86 to include a local copy 90 of forwarding information 84, or portions thereof. This embodiment may be particularly advantageous in reducing the number of messages between routing engine 85 and packet forwarding engine 80. Upon updating routing information 86 due to a change of network topology, routing engine 85 may identify the next hop data to be changed by examining the copy of forwarding information 90. Based on the examination, routing engine 85 may generate a limited number of messages directing forwarding engine 85 to appropriately update next hop data within forwarding information 84. In particular, routing engine 85 may generate a single message directing packet forwarding engine 80 to overwrite a common next hop datum referenced by indirect next hop data structures within leaf nodes of a forwarding tree. This may greatly reduce the number of messages between routing engine 85 and packet forwarding engine 80, primarily because the number of messages is no longer a function of the number of routes affected by the change, as with conventional routers.

Figure 5:
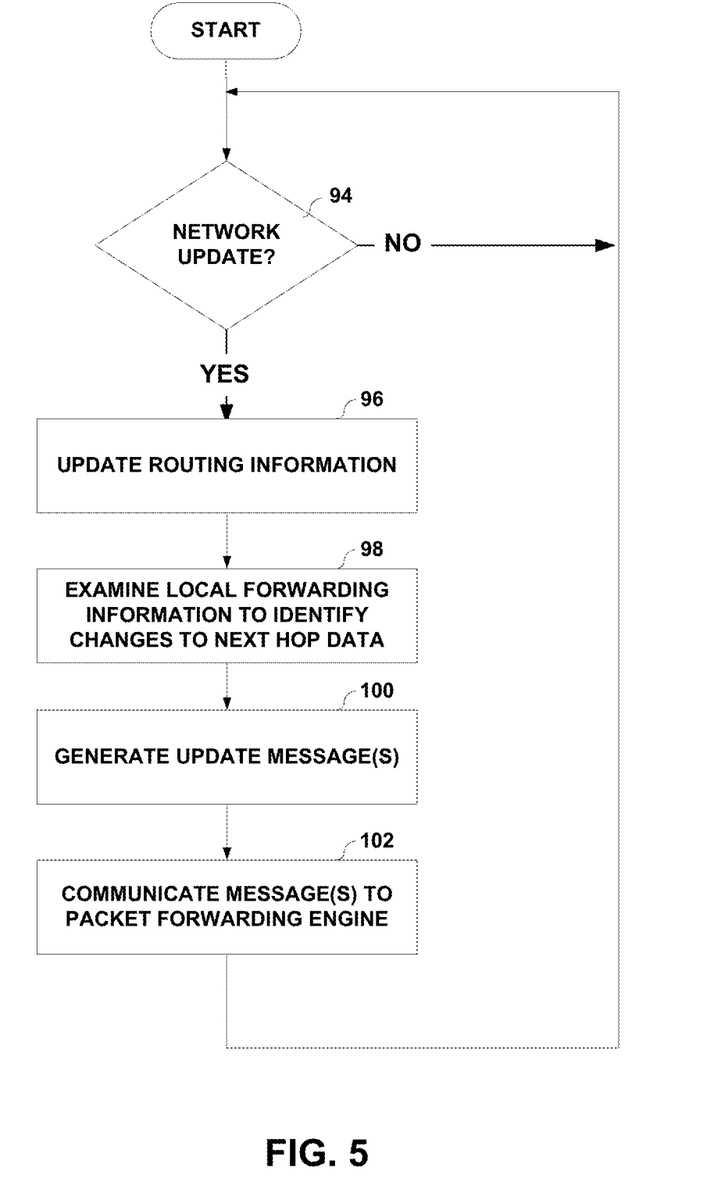
FIG. 5 is a flow chart illustrating an example operation of a router making use of indirect next hop data.

FIG. 5 is a flow chart illustrating an example operation of routing engine 85 consistent with the principles of the invention. Upon receiving new network information from another network node (94), routing engine 85 updates routing information 86. Router 4 may receive, for example, network information via the Border Gateway Protocol (BGP) or other protocol for sharing network information.

After updating routing information 86, routing engine 85 examines a local copy of forwarding information 90 to determine whether packets can be dynamically rerouted by changing next hop data (98). Based on the examination, routing engine 85 may generate one or more update messages directing packet forwarding engine 80 to appropriately update next hop data within forwarding information 84 (100). Routing engine 85 communicates the messages to packet forwarding engine 80 to update next hop data as referenced by indirect next hop data structures within leaf nodes of a forwarding tree within forwarding information 84. As described above, packet forwarding engine 80 may dynamically reroute packets by modifying a common portion of the next hop data, such as an element of an array. Forwarding engine 80 may, for example, write new next hop to one or more elements of the array, thereby quickly rerouting packets to an alternate next hop. In this manner, packet forwarding engine 80 may not need to change the forwarding tree itself, which may greatly reduce the number of messages between routing engine 85 and forwarding engine 80.

Furthermore, packet forwarding engine 80 may promote backup next hop references within corresponding leaf nodes of the forwarding tree to primary next hop references, and may mark existing primary next hop references as inactive. In this manner, packet forwarding engine 80 may quickly reroute packets to a precomputed backup next hop.

Various embodiments of the invention have been described that provide for increased efficiency in updating routing information after a change in network topology, such as link failure. These and other embodiments are within the scope of the following claims.

The invention claimed is:

1. A method comprising:
  storing, within hardware of a packet forwarding engine within a network device, a forwarding tree that includes a set of hierarchically arranged nodes, wherein the set of nodes includes a root node, a plurality of intermediate nodes, and a plurality of leaf nodes, wherein each of the leaf nodes stores a first data pointer and a second data pointer that each point to respective data structures that are external to the forwarding tree, wherein the external data structure pointed to by the first pointer specifies a primary next hop and the external data structure pointed to by the second pointer specifies a backup next hop;
  forwarding packets with the packet forwarding engine to the primary next hop for at least one of the leaf nodes of the forwarding tree;
  in response to a network event, with the packet forwarding engine and for the at least one of the leaf nodes, marking the first data pointer as inactive to promote the second data pointer that defines the backup next hop to a data pointer that defines a new primary next hop; and
  forwarding packets with the packet forwarding engine to the new primary next hop.

2. The method of claim 1, wherein forwarding packets with the packet forwarding engine to the new primary next hop comprises:
  receiving, at the network device, the packets to be routed through a network;
  identifying, within each of the packets, a key within the packet, wherein the key includes a set of bits that identify a network destination for the packet;
  traversing, based at least on the set of bits of the key, the forwarding tree within the network device; and
  selecting, responsive the first data pointer being marked inactive, the external data structure pointed to by the second pointer to determine the next hop for the packets.

3. The method of claim 1, further comprising:
  forwarding, based on the next hop specified by the selected external data structure, the packets to a particular interface port of the network device that is coupled to the network link so as to forward the packet.

4. The method of claim 1, wherein the forwarding tree comprises a radix tree.

5. The method of claim 1, further comprising:
  storing routing information within a routing engine of the network device;
  generating the forwarding tree and the data structures that are external to the forwarding tree based on the routing information; and
  communicating, with the routing engine, the forwarding tree and the data structures that are external to the forwarding tree to the packet forwarding engine.

6. The method of claim 5, wherein marking the first data pointer as inactive to promote the second data pointer that defines the backup next hop to a data pointer that defines a new primary next hop is performed by the hardware within the packet forwarding engine without intervention of the routing engine.

7. A network device comprising:
  a packet forwarding engine having hardware that stores a forwarding tree that includes a set of hierarchically arranged nodes, wherein the set of nodes includes a root node, a plurality of intermediate nodes, and a plurality of leaf nodes, wherein each of the leaf nodes stores a first data pointer and a second data pointer that each point to respective data structures that are external to the forwarding tree, wherein the external data structure pointed to by the first pointer specifies a primary next hop and the external data structure pointed to by the second pointer specifies a backup next hop,
  wherein the packet forwarding engine is configured to:
    initially forward packets to the primary next hop for at least one of the leaf nodes of the forwarding tree;
    in response to a network event, mark the first data pointer of the at least one leaf node as inactive to promote the second data pointer that defines the backup next hop to a data pointer that defines a new primary next hop;
    forward packets to the new primary next hop.

8. The network device of claim 7, wherein the packet forwarding engine is configured to:
  receive, at the network device, the packets to be routed through a network;
  identify, within each of the packets, a key within the packet, wherein the key includes a set of bits that identify a network destination for the packet;

traverse, based at least on the set of bits of the key, the forwarding tree within the network device; and select, responsive the first data pointer being marked inactive, the external data structure pointed to by the second pointer to determine the next hop for the packets.

9. The network device of claim 7, wherein the packet forwarding engine selects a particular interface port of the network device to which to forward the packets based on the next hop specified by the selected external data structure.

10. The network device of claim 7, wherein the forwarding tree comprises a radix tree.

11. The network device of claim 7, further comprising:

one or more processors;

a routing engine executed by the one or more processors, the routing engine configured to maintain routing information representative of a topology of a network, wherein the routing engine generates the forwarding tree and the data structures that are external to the forwarding tree based on the routing information and communicates the forwarding tree and the data structures to the packet forwarding engine.

12. The network device of claim 11, wherein the packet forwarding engine marks the first data pointer as inactive to promote the second data pointer without intervention of the routing engine.

* * * * *